(12) United States Patent
Dixon et al.

(10) Patent No.: US 11,430,239 B2
(45) Date of Patent: Aug. 30, 2022

(54) HANDWRITTEN TEXT RECOGNITION

(71) Applicant: Apple Inc., Cupertino, CA (US)

(72) Inventors: Ryan S. Dixon, Mountain View, CA (US); Adrien Delaye, Sunnyvale, CA (US); Daniel E. Gobera Rubalcava, San Jose, CA (US); Dominic L. Howell, San Jose, CA (US); Youssouf K. Chherawala, Sunnyvale, CA (US); Martin Bresler, Nová Ves nad Nisou (CZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/859,936

(22) Filed: Apr. 27, 2020

(65) Prior Publication Data
US 2020/0257899 A1 Aug. 13, 2020

Related U.S. Application Data

(63) Continuation of application No. 15/721,710, filed on Sep. 29, 2017, now Pat. No. 10,671,844.
(Continued)

(51) Int. Cl.
*G06V 30/32* (2022.01)
*G06K 9/62* (2022.01)
(Continued)

(52) U.S. Cl.
CPC .............. *G06V 30/36* (2022.01); *G06F 3/017* (2013.01); *G06F 3/03545* (2013.01);
(Continued)

(58) Field of Classification Search
CPC .... G06K 9/00422; G06K 9/42; G06K 9/6217; G06K 9/6267; G06K 9/222;
(Continued)

(56) References Cited

U.S. PATENT DOCUMENTS

| 4,715,102 A | 12/1987 | Wolf et al. |
| 5,343,537 A * | 8/1994 | Bellegarda ........... G06K 9/6217 382/186 |

(Continued)

OTHER PUBLICATIONS

Zitnick, "Handwriting Beautification Using Token Means," Microsoft Research, 2013, retrieved from http://larryzitnick.org/publication/ZitnickSiggraph2013.pdf, 8 pages.

*Primary Examiner* — Mark Roz
(74) *Attorney, Agent, or Firm* — BakerHostetler

(57) ABSTRACT

The subject technology provides for receiving a new input stroke. The subject technology determines whether the new input stroke is associated with an existing line group based on a writing direction estimate of the existing line group. The subject technology merges the new input stroke with the existing line group in response to determining that the new input stroke is associated with the existing line group. The subject technology determines a local orientation of the existing line group including the new input stroke based on an estimate of a direction of writing and a scale of each stroke. The subject technology normalizes the existing line group including the new input stroke using the determined location orientation.

20 Claims, 11 Drawing Sheets

Related U.S. Application Data

(60) Provisional application No. 62/514,772, filed on Jun. 2, 2017.

(51) Int. Cl.
  *G06F 3/04883* (2022.01)
  *G06F 3/01* (2006.01)
  *G06F 3/0354* (2013.01)
  *G06F 3/041* (2006.01)
  *G06V 10/32* (2022.01)
  *G06V 30/142* (2022.01)

(52) U.S. Cl.
  CPC ........ *G06F 3/0412* (2013.01); *G06F 3/04883* (2013.01); *G06K 9/6217* (2013.01); *G06K 9/6267* (2013.01); *G06V 10/32* (2022.01); *G06V 30/1423* (2022.01); *G06V 30/333* (2022.01)

(58) Field of Classification Search
  CPC .............. G06K 9/00409; G06F 3/0412; G06F 3/04883; G06F 3/017; G06F 3/03545
  See application file for complete search history.

(56) References Cited

U.S. PATENT DOCUMENTS

| | | |
|---|---|---|
| 7,680,332 B2 | 3/2010 | Ye et al. |
| 9,378,427 B2 | 6/2016 | Hirabayashi |
| 9,621,761 B1 | 4/2017 | Abbas |
| 2009/0136136 A1* | 5/2009 | Mori .................. G06K 9/222 382/187 |
| 2011/0285634 A1 | 11/2011 | Lim et al. |
| 2014/0325351 A1 | 10/2014 | Hirabayashi |
| 2015/0116282 A1 | 4/2015 | Black |
| 2016/0162175 A1 | 6/2016 | Terunuma et al. |
| 2016/0283785 A1 | 9/2016 | Zaitsev et al. |
| 2017/0068854 A1 | 3/2017 | Markiewicz et al. |

* cited by examiner

HANDWRITTEN TEXT RECOGNITION

CROSS-REFERENCE TO RELATED APPLICATIONS

The present application claims the benefit of U.S. Nonprovisional patent application Ser. No. 15/721,710, entitled "HANDWRITTEN TEXT RECOGNITION," filed Sep. 29, 2017, which claims the benefit of U.S. Provisional Patent Application Ser. No. 62/514,772, entitled "HANDWRITTEN TEXT RECOGNITION," filed Jun. 2, 2017, each of which is hereby incorporated herein by reference in its entirety and made part of the present U.S. Utility Patent Application for all purposes.

TECHNICAL FIELD

The present description relates generally to processing input from an input device such as an electronic stylus or pen/pencil, and/or touch inputs, including handwritten text recognition.

BACKGROUND

Interaction with electronic devices can be performed using various input devices, such as touch screen displays, touch-sensitive surfaces, remote controls, mice and other input devices. Touch-sensitive surfaces and touch screen displays, in particular, have become increasingly popular input devices, as has providing handwritten input using such input devices. Providing for robust character recognition of handwritten input enhances the user's experience with the device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
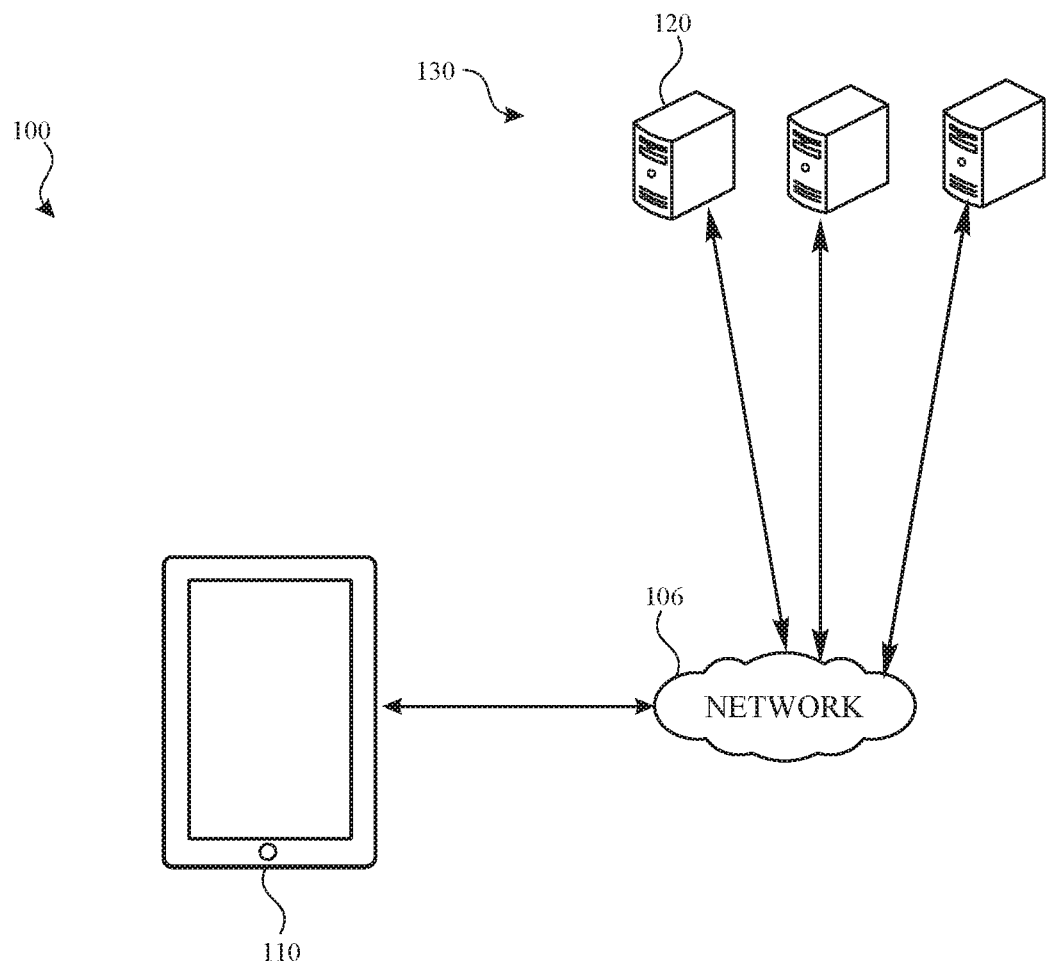
FIG. 1 illustrates an example network environment including an electronic device that may implement the subject system for handwritten text recognition in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A handwriting input method may be an input method for electronic devices that include touch-sensitive surfaces (e.g., touch-sensitive screens, or touch-pads, etc.). Human handwriting may be vastly variable (e.g., in terms of stroke order, size, writing style, language, etc.), and reliable handwriting recognition software tends to be complex and requires a considerable training process. Implementing efficient handwriting recognition on an electronic device with limited computing resources and/or memory is a non-trivial challenge.

Handwritten content can be received at an electronic device as, for example, one or more touch inputs and/or as inputs from an electronic stylus or pen/pencil. Such handwritten content can include handwritten text in one or more languages and in any orientation, and/or may include doodles or other non-textual content. Most software applications do not have the capability to directly process the handwritten content and must convert it into a different form, such as text characters (e.g., ASCII or Unicode). The conversion process typically includes handwriting recognition using handwriting recognition algorithms. Such handwriting recognition algorithms may be unsuccessful when the handwritten content is written in a more freeform style involving curves or angles. Further, handwriting recognition algorithms may fail at recognizing the handwriting when different groups of handwriting strokes are not readily distinguishable, such as when two words are overlapping or written closely together.

Additionally, existing software application may not have the capability for searching handwritten content. As the popularity of handwritten content increases and users are creating handwritten content, often including the handwritten content in files or documents, there is a desire to quickly locate the handwritten content to improve productivity and improve the user experience on a given software platform.

In the subject handwritten text recognition system, handwritten text can be recognized from handwritten content in any language and in any orientation, including a curved orientation that is non-static across the handwritten content. Furthermore, the subject system can disambiguate between different overlapping lines of handwritten content and can disambiguate between handwritten text and other handwritten content, such as doodles and the like. In this manner, the subject system can efficiently recognize textual portions of handwritten content and can link the recognized textual portions to the handwritten content, such as for subsequent searching, and/or to automatically generate a note/memo or a filename from the handwritten content.

FIG. 1 illustrates an example network environment 100 including an electronic device 110 that may implement the subject system for handwritten text recognition in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110 and a server 120 that may be included in a group of servers 130. The network 106 may communicatively (directly or indirectly) couple, for example, the electronic device 110 with the server 120 and/or the group of servers 130. In one or more implementations, the network 106 may be an interconnected network of devices that may include, or may be communicatively coupled to, the Internet. For explanatory purposes, the network environment 100 is illustrated in FIG. 1 as including the electronic device 110, the server 120, and the group of servers 130; however, the network environment 100 may include any number of electronic devices and any number of servers or a data center including multiple servers.

The electronic device 110 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a virtual reality or augmented reality environment. In one or more implementations, the electronic device 110 may include a touchpad. In FIG. 1, by way of example, the electronic device 110 is depicted as a tablet device with a touchscreen. In one or more implementations, the electronic device 110 may be, and/or may include all or part of, the electronic device discussed below with respect to the electronic system discussed below with respect to FIG. 10.

The electronic device 110 may include one or more contact intensity sensors. A contact intensity sensor may include one or more piezoresistive strain gauges, capacitive force sensors, electric force sensors, piezoelectric force sensors, optical force sensors, capacitive touch-sensitive surfaces, or other intensity sensors (e.g., sensors used to measure the force and/or pressure of a contact on a touch-sensitive surface). In an example, a contact intensity sensor can receive contact intensity information (e.g., pressure information or a proxy for pressure information) from the environment. Further, the electronic device 110 can also include at least one contact intensity sensor that is collocated with, or proximate to, a touch-sensitive surface. The electronic device 110, in one example, may also include at least one contact intensity sensor that is located on the back of the electronic device 110, opposite the touchscreen which may be located on the front of electronic device 110.

An intensity of a contact on a touch-sensitive surface (e.g., touchscreen, touchpad, etc.) can refer to a force or a pressure (force per unit area) of a contact (e.g., a finger contact or a stylus contact) on the touch-sensitive surface. Intensity of a contact can be determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Thus, it is appreciated that the contact intensity sensors provided by the electronic device 110 can measure a respective force measurement and/or a respective pressure measurement of a given contact on the touch-sensitive surface.

The electronic device 110 may implement the subject system to provide handwriting recognition via touchscreen and be configured to receive handwritten input via different input methods including touch input, or from an electronic stylus or pen/pencil. The electronic device 110 may implement the example software architecture for handwritten content recognition that is discussed further below with respect to FIG. 3. Examples of handwritten content operations are discussed further below with respect to FIGS. 4A, 4B, 5, and 6.

The server 120 may be part of a network of computers or the group of servers 130, such as in a cloud computing or data center implementation. The server 120 and/or the group of servers 130 may store data, such as handwritten content, photos, music, text, web pages and/or content provided therein, etc., that may be accessible on the electronic device 110. In one or more implementations, the electronic device 110 may support an operation that involves handwritten content that is physically stored on the server 120 and/or one or more servers from the group of servers 130. Examples of handwritten content are illustrated in FIG. 2 discussed below.

Figure 2:
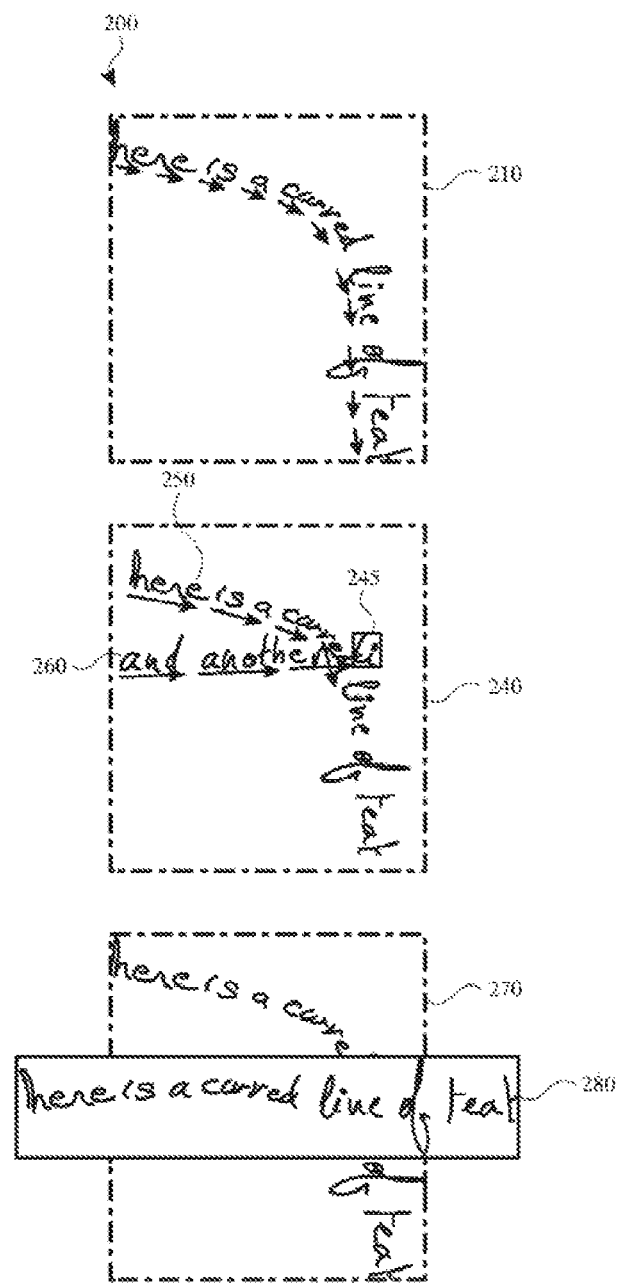
FIG. 2 illustrates examples of different handwritten text in accordance with one or more implementations.

FIG. 2 illustrates examples 200 of different handwritten content 210, 240, and 270 in accordance with one or more implementations. Although three examples of handwritten are shown in FIG. 2 for purposes of explanation, it is appreciated that many other different types of handwriting may be supported by the subject technology. Further not all handwritten content need to be curved and/or overlapping as illustrated in the examples 200 of FIG. 2, and the subject technology may process any type of handwritten content.

As illustrated in FIG. 2, handwritten content 210 includes curved handwritten writing including multiple words and arrows that indicate a writing direction of a line of text corresponding to the curved handwriting. An example of determining the writing direction of a given line of text is described in FIG. 5 below. The handwritten content 240 includes two separate handwritten lines of text 250 and 260 that are overlapping. Example processes for distinguishing between overlapping lines of text and assigning a stroke 245 to a particular line of text are described in further detail in FIGS. 4A and 4B. As further illustrated, the handwritten content 270 includes a line of text after undergoing a normalization process as further described in FIG. 6 below. Although FIG. 2 illustrates examples of handwritten content, it is appreciated that handwritten content may include handwritten text that is written in different directions. For example, such handwritten text may be written right to left, top to down, down to top, or any direction, etc.

Figure 3:
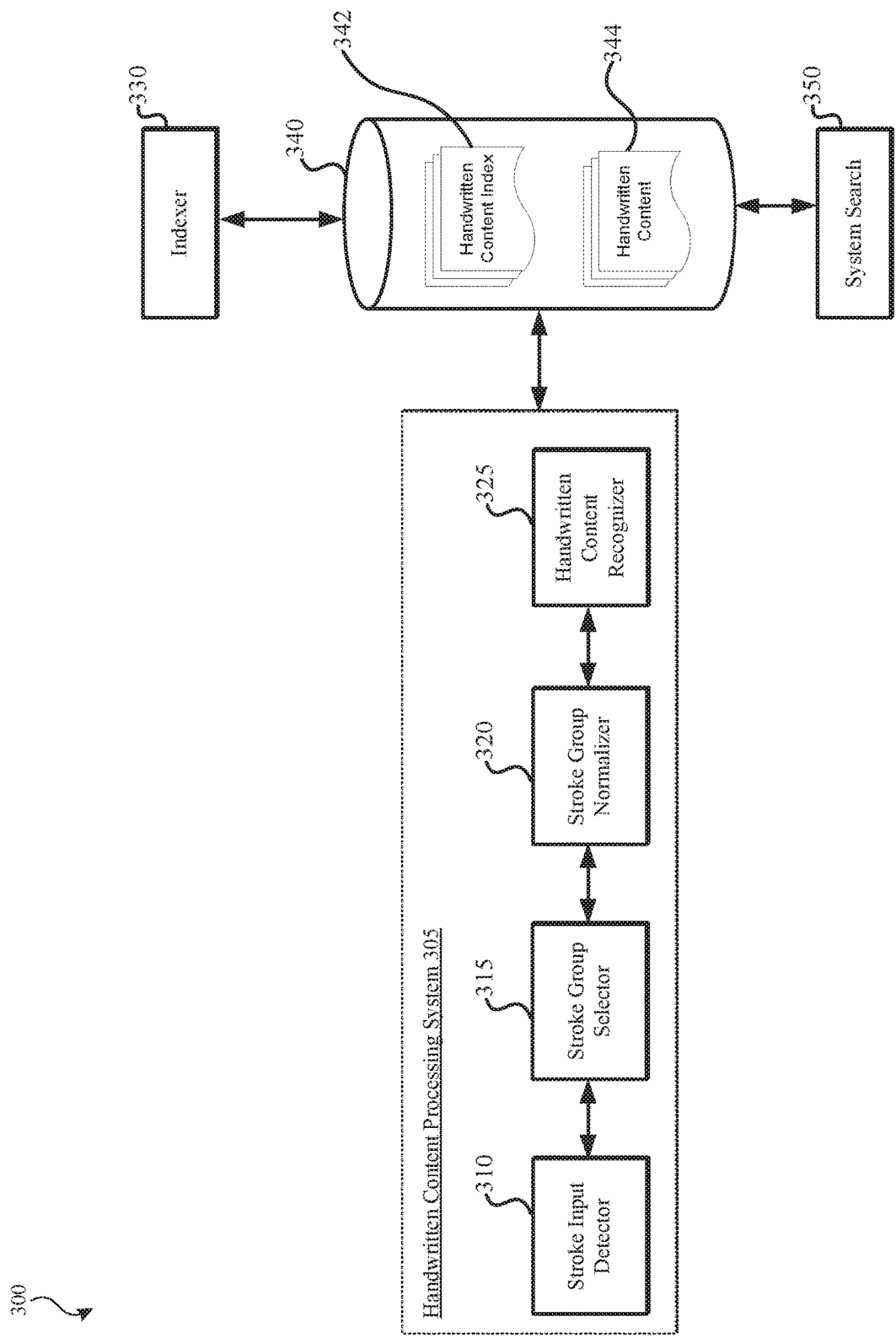
FIG. 3 illustrates an example software architecture that provides handwritten text recognition for enabling searching handwritten text in accordance with one or more implementations.

FIG. 3 illustrates an example software architecture 300 that provides handwritten text recognition for enabling searching handwritten content in accordance with one or more implementations. For explanatory purposes, the software architecture 300 is described as being provided by the electronic device 110 of FIG. 1, such as by a processor and/or memory of the electronic device 110; however, the software architecture 300 may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated in FIG. 3, the software architecture 300 includes a handwritten content processing system 305. The handwritten content processing system 305 includes a stroke input detector 310, a stroke group selector 315, a stroke group normalizer 320, and a handwritten content recognizer 325.

The stroke input detector 310 receives input strokes corresponding to handwritten input from a user. In one or more implementations, the stroke input detector 310 determines for a given input stroke the time, location, direction, stroke pressure, and/or stroke force for the input stroke. Stroke pressure as mentioned herein can refer to a measurement of pressure (e.g., force per unit area) of a contact (e.g., a finger contact or a stylus contact) corresponding to a stroke input on a given touch-sensitive surface (e.g., touchscreen, touchpad, etc.). The stroke input detector 310 samples multiple points within a stroke, takes a timestamp for each point sampled in each stroke. Each point within the stroke may include additional data such as location/proximity, stroke pressure, and/or stroke force. In an example, an input stroke can refer to stroke data received starting at stylus down (or an initial touch input) to stylus up (or a touch release), and, for each input stroke, a set of points that are part of each stroke are sampled.

The stroke group selector 315 segments received input strokes into a group that represents a line of text and determines which group new input strokes should be assigned to using operations described in more detail in FIGS. 4A, 4B, and 5 below. The stroke group normalizer 320 normalizes (e.g., straightening, stretching, cropping, down-sample or up-sampling, etc.) a given group of input strokes such that the group of input strokes can be provided to the handwritten content recognizer 325 as input. An example process for normalizing a line of text is described in FIG. 6.

The handwritten content recognizer 325 is trained to recognize a large number of characters in multiple scripts (e.g., Latin script, Chinese characters, Arabic letters, Farsi, Cyrillic, artificial scripts such as emoji characters, etc.) in at least an implementation. In one or more implementations, the handwritten content recognizer 325 compares combinations of the recognized characters with a lexicon or dictionary of words in the recognized language to determine candidate words, then assigns a confidence score for each candidate word (e.g., using a probabilistic algorithm to determine a confidence score of each candidate word). Additionally, the handwritten content recognizer 325 utilizes a ranking algorithm for top n number of likely words. The top candidate words can be stored in a handwritten content index 342 for searches.

As further illustrated in FIG. 3, the software architecture 300 includes a handwritten content database 340 which provides storage for handwritten content 344. The handwritten content 344 may include electronic versions of handwritten input based on the input strokes received by the electronic device 110. For example, the handwritten content 344 may include files, documents, images, etc., with handwritten content and/or associated metadata for the handwritten content. Such metadata can include information for rendering the handwritten content for display on the electronic device 110. The software architecture 300 includes an indexer 330 that indexes the handwritten content 344 with associated input stroke data and stores index data for performing searches on the handwritten content and the associated input stroke data into the handwritten content index 342. The software architecture 300 further includes a system search component 350 that enables searches to be performed, on a system-wide or device-wide level, on the handwritten content 344 by using the handwritten content index 342. An example, graphical user interface for performing a search is described in FIG. 8.

Further, although recognition of handwritten content is described above, implementations of the subject technology are capable of distinguishing between handwritten content corresponding to text characters and handwritten content that corresponds to, for example, doodles or artwork (e.g., non-textual information). Examples of determining such non-textual information in handwritten content is further described in FIGS. 7 and 9 below.

Implementations of the subject technology provide techniques for assigning an input stroke to a stroke group (e.g., a group of input strokes corresponding to a line of handwritten text). No assumption about line writing direction, straightness or scale is made by the techniques described herein. The subject technology is advantageously enabled to follow and normalize a sequence of handwritten printed or cursive characters along any continuous curve: straight line, wavy lines, lines with sharp angles, spirals, squared spirals, etc. The subject technology is agnostic to the script (Latin alphabet, Chinese characters, Arabic, etc.) present in the handwritten content, and can handle any patterns that exhibit the characteristics of handwritten text without assuming or being reliant upon more regularity in the text lines (e.g., horizontality of the writing, enforcing of writing direction, straightness of the text lines, no invariance in character orientation, strict regularity in the size of characters, etc.).

Figure 4A:
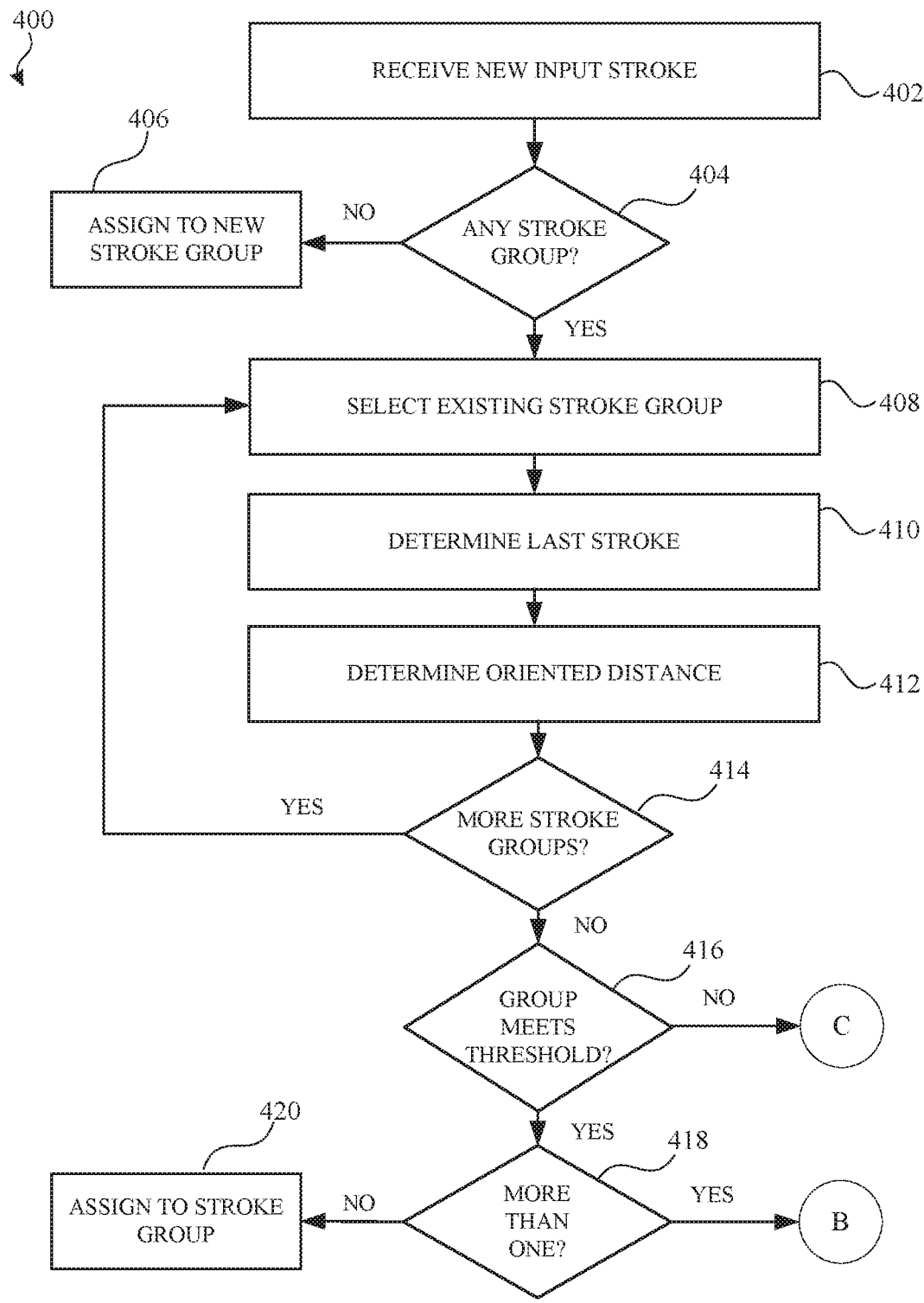
FIG. 4A illustrates a flow diagram of an example process for assigning an input stroke to a stroke group in accordance with one or more implementations.

FIG. 4A illustrates a flow diagram of an example process 400 for assigning an input stroke to a stroke group in accordance with one or more implementations. For explanatory purposes, the process 400 is primarily described herein with reference to components of the handwritten content processing system 305 of FIG. 3, which may be executed by the electronic device 110 of FIG. 1. However, the process 400 is not limited to the electronic device 110, and one or more blocks (or operations) of the process 400 may be performed by one or more other components of other suitable devices and/or software applications. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The process 400 segments input strokes into fragments which may be also referred to as substrokes herein. In an example, fragments can be full strokes, or sub-sections of complex strokes in which complexity can be based on length or curvature measures. Initially, strokes fragments are grouped together into text lines based on spatial proximity. When at least multiple fragments are received, these fragments are grouped together in one text line and the orientation of writing and the character size locally are estimated for every fragment in the text line (e.g., measured by an angle and a scalar value). The fragments are sorted along the text line so that the line can be processed by starting from the first fragment and moving along the local writing orientation all the way to the last fragment, e.g., based on a direction of writing. In at least one implementation, the local orientation is the information that drives the two main features of a text line grouping algorithm described in the process 400.

The stroke input detector 310 receives an input stroke (402). The stroke input detector 310 may store this received input stroke into a buffer for (temporary) storage during the process 400 for determining a stroke group to assign the received input stroke. As referred to herein, a stroke group is a collection of strokes representing a line of text. The strokes are ordered according to an estimate of the writing order within the group. For each stroke inside a group, the writing direction estimate (e.g., a two-dimensional vector) and a scale estimate (e.g., a two-dimensional vector) are stored (e.g., in a buffer). When a new stroke comes in, these computed estimates are utilized to determine if the new input stroke belongs to an existing group as discussed below, for example, in FIG. 5.

The stroke group selector 315 determines whether any stroke group exists (404). If there are no existing stroke groups, the input stroke is assigned to its own new group (406). If there is at least one existing group, each existing stroke group is considered for merging with the received input stroke.

In a first pass (e.g., end-of-line merge), each group is considered as a candidate to get the new input stroke assigned as a continuation of its text line (e.g., line of text corresponding to the stroke group). For determining this, a writing orientation and a scale of the last stroke of the stroke group (e.g., according to the writing order) are used to determine an oriented distance from the stroke group to the new input stroke. As described herein, an end-of-line merge can refer to merging a new input stroke to a last stroke of an existing stroke group.

In an example, a writing orientation vector at a stroke can be represented as, for example, vector a=(ax, ay) defined in the original coordinate space where the strokes are collected. A unit vector (e.g., ax*ax+ay*ay=1.0) accounts for an orientation. The corresponding angle can be determined as, for example, alpha=arctan(ay/ax). The scale information gives an estimate of a size of (e.g., how big) a character represented by the stroke. The scale information may be represented by a vector s=(sx, sy), and is expressed in the coordinate space rotated based on the unit vector a (e.g., in a space rotated from the original coordinate space by the angle alpha). An example process for determining how the writing orientation a and scale s are calculated for each stroke, and how the ordering of the strokes is determined is further described in FIG. 5 below.

The stroke group selector 315 selects an existing stroke group (408). The stroke group selector 315 determines a last stroke from the existing stroke group (410). The stroke group selector 315 determines an oriented distance from the last stroke to the new input stroke (412). In an implementation, an oriented distance calculation can be determined using the following operations. First, a vector v pointing from the last stroke S of the selected group to the new input stroke T is determined. This vector v is an average of a vector connecting the two closest points of the two strokes and a vector connecting their centers. The vector v is also rotated by the writing orientation alpha at stroke S and it is normalized by the scale s of stroke S. The oriented distance is the weighted norm of vector v. Different coefficients can be chosen to weight differently the x and y component of v when measuring an oriented distance for different cases (e.g., an end-of-line merge distance or a delayed-stroke merge distance). The determined oriented distance can be stored in a buffer by the stroke group selector 315 for further processing.

After the oriented distance is determined, the stroke group selector 315 determines whether any other stroke groups exist (414). If so, the stroke group selector 315 can select another stroke group (408) and repeat the operations described above from there to determine another oriented distance for the different stroke group. These repeated operations may be performed until the oriented distance is determined for each stroke group.

The stroke group selector 315 determines whether there is at least one stroke group that meets a threshold for assigning the input stroke based on its oriented distance (416). For example, the oriented distance of a particular stroke group is compared to a threshold to determine if the new input stroke is an acceptable continuation of the text line or not. If only one stroke group meets the threshold (418), the new input stroke is assigned (e.g., merged) to this stroke group (420) and the grouping assignment is complete. Otherwise, if no stroke group meets the threshold (416), the stroke group selector 315 performs the operations further described in FIG. 4B below (e.g., as indicated as a circle "C") for a second pass (e.g., delayed-stroke merge) that considers that the input new stroke can be a delayed stroke to be inserted in the middle of every stroke group. Alternatively, if more than one stroke group are good candidates for the new input stroke (418), each of the respective oriented distances to the new input stroke (as described above) are compared as further described in FIG. 4B below (e.g., as indicated as a circle "B"). By reference to FIG. 2, the handwritten content 240 includes two separate handwritten lines of text 250 and 260 which may be good candidates for assigning stroke 245.

In one or more implementations, there could be more than a single threshold to decide if the new stroke should be merged at the end of existing groups or in the middle of existing groups, as a delayed stroke. For example, there can be two thresholds: a high confidence threshold t1 and a low confidence threshold t2. If the quality of the merge of the input stroke with an existing group as an end of line meets the high confidence threshold t1, then the input stroke will be merged as an end-of-line (e.g., according to a decision made at (418) if there are several groups) and the input stroke will not be considered for a delayed-stroke merge. Alternatively, if the quality only meets the low confidence threshold t2, then the merge of the input stroke as a delayed stroke will be considered. After both types of merges are evaluated against existing stroke groups, a final decision can be made by comparing the quality of the merge as an end-of-line versus the quality of the merge as a delayed stroke. In one or more implementations, if the low-confidence threshold t2 is not even met, then only a delayed-stroke merge may be considered.

Figure 4B:
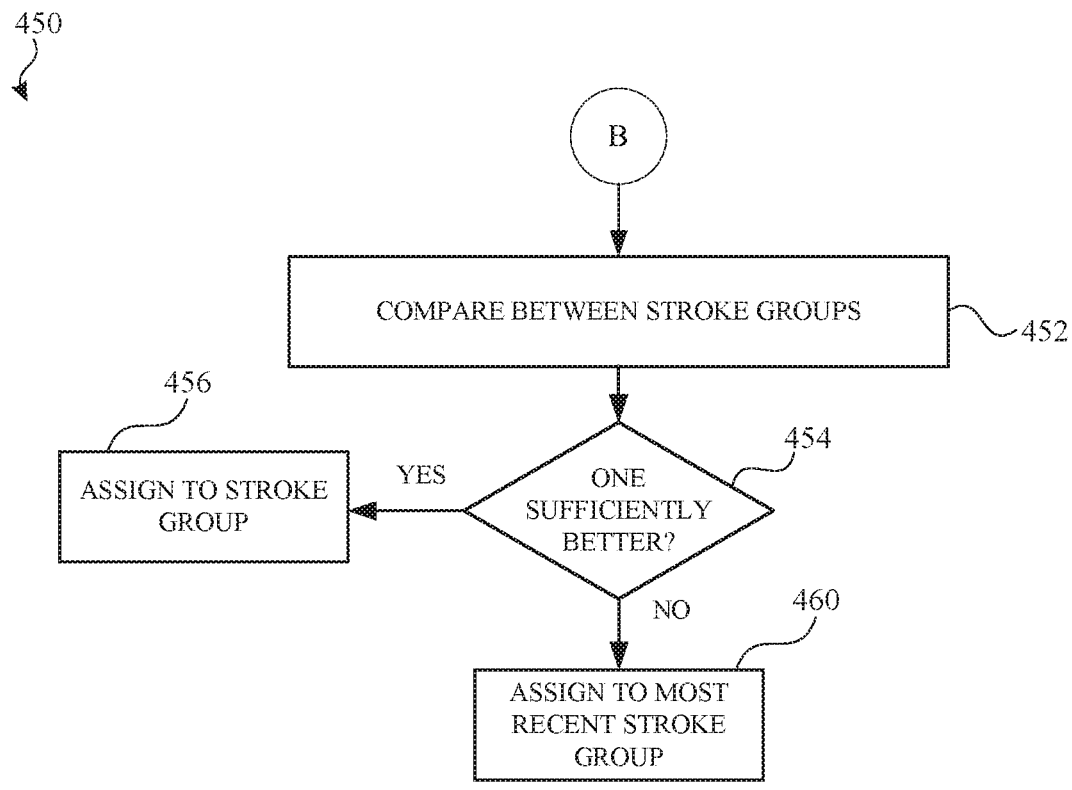
FIG. 4B illustrates a flow diagram of an example process for further handling multiple stroke groups for assigning a new input stroke and performing a delayed stroke merge with a stroke group in accordance with one or more implementations.
Figure 4B:
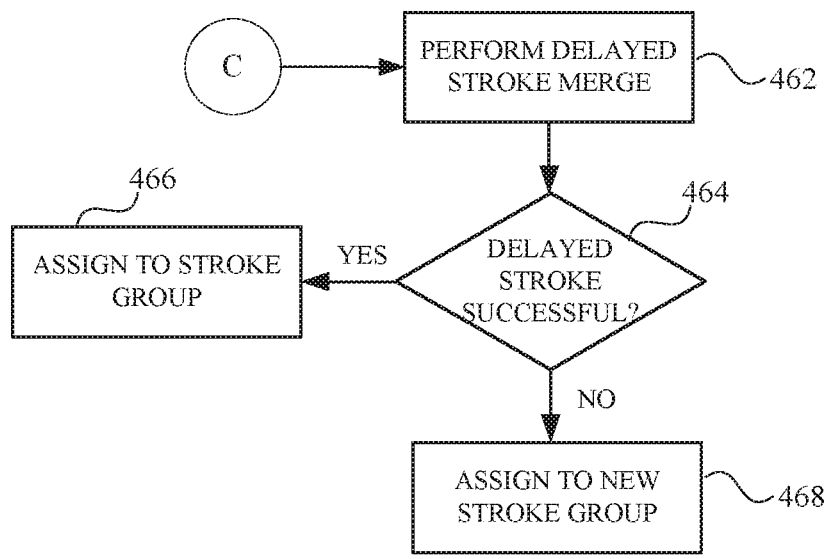

FIG. 4B illustrates a flow diagram of an example process 450 for further handling multiple stroke groups for assigning a new input stroke and performing a delayed stroke merge with a stroke group in accordance with one or more implementations. For explanatory purposes, the process 450 is primarily described herein with reference to components of the handwritten content processing system 305 of FIG. 3, which may be executed by the electronic device 110 of FIG. 1. However, the process 450 is not limited to the electronic device 110, and one or more blocks (or operations) of the process 450 may be performed by one or more other components of other suitable devices and/or software applications. Further for explanatory purposes, the blocks of the process 450 are described herein as occurring in serial, or linearly. However, multiple blocks of the process 450 may occur in parallel. In addition, the blocks of the process 450 need not be performed in the order shown and/or one or more blocks of the process 450 need not be performed and/or can be replaced by other operations.

As discussed above in FIG. 4A (e.g., starting from as indicated by circle "B" in FIG. 4A and continuing to circle "B" in FIG. 4B), if more than one stroke group are good candidates for the new input stroke (418), each of the respective oriented distances to the new input stroke (as described above) are compared (452) by the stroke group selector 315. If an oriented distance of a particular stroke group is sufficiently better (e.g., based on a threshold amount) than the others (454), the stroke group selector 315 assigns the new input stroke to that particular stroke group (456). In an example, a threshold on the differences of oriented distances determines if the particular stroke group with the lowest distance is sufficiently better than the other stroke groups to be assigned the new input stroke. For example, based on a threshold amount of the differences of oriented distances, if a particular stroke group includes an oriented distance above that threshold amount, then that particular stroke group is selected.

If there is no particular stroke group that is considered sufficiently better, the stroke group selector 315 determines whether a stroke group which has the most "recent" last stroke (based on the writing timestamp attached to each stroke) wins the new stroke (458). If so, the stroke group selector 315 assigns the new input stroke to the stroke group with the most recent last stroke based on the timestamp information (460). Alternatively, in an example, when there is no known stroke ordering, a stroke group with the best score for oriented distance is selected irrespective of the difference from the second best score of a different stroke group.

Further, as discussed above in FIG. 4A (e.g., starting from as indicated by circle "C" in FIG. 4A and continuing to circle "C" in FIG. 4B), if no stroke group meets the threshold (416), the stroke group selector 315 performs the operations for the delayed-stroke merge (462) in a second pass. In this second pass for the delayed stroke merge, for each stroke group, every stroke except the last one is used to determine an oriented distance to the new input stroke. The same decision process for the operations described in FIG. 4A above applies as in the first pass to determine which stroke group wins the new input stroke.

If the stroke group selector 315 determines that the delayed stroke merge was successful (464), the new input stroke is assigned to that particular stroke group based on the results of the delayed stroke merge (466). Otherwise, the stroke group selector 315 assigns (468) the new input stroke to a new stroke group (e.g., as a start of a new text line).

It is further appreciated that the processes 400 and 450 can be generalized to work with substrokes instead of strokes. For example, the original strokes are first split into substrokes at certain cut points. Such cut points can be determined according to multiple techniques (e.g., curvature based detection, extrema detection, etc.), then the substrokes are handled like strokes as described above in FIGS. 4A and 4B.

Figure 5:
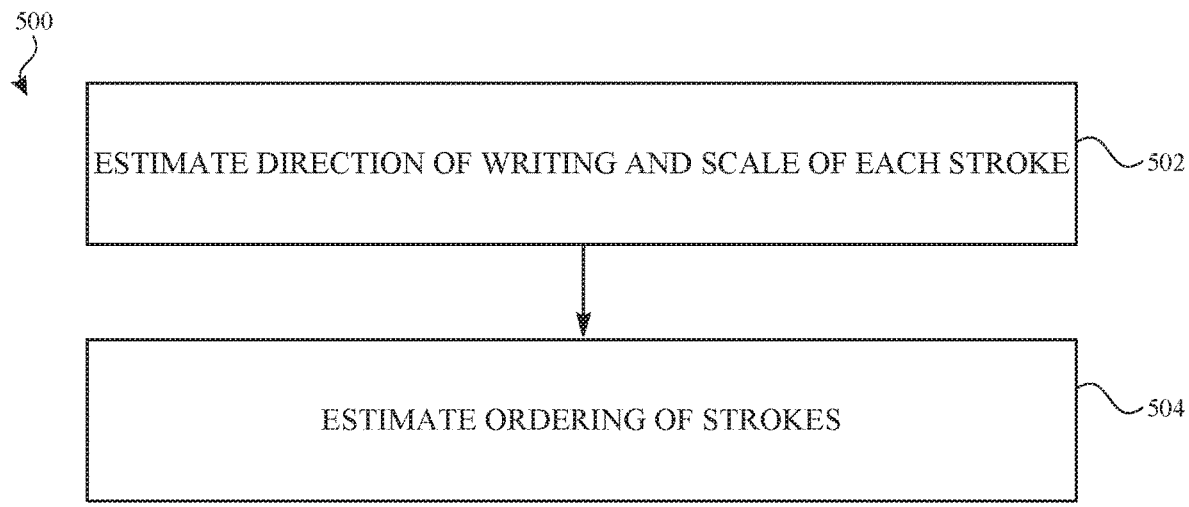
FIG. 5 illustrates a flow diagram of an example process for determining writing orientation and scale of each stroke when stroke grouping is fixed in accordance with one or more implementations.

FIG. 5 illustrates a flow diagram of an example process 500 for determining writing orientation and scale of each stroke when stroke grouping is fixed in accordance with one or more implementations. For explanatory purposes, the process 500 is primarily described herein with reference to components of the handwritten content processing system 305 of FIG. 3, which may be executed by the electronic device 110 of FIG. 1. However, the process 500 is not limited to the electronic device 110, and one or more blocks (or operations) of the process 500 may be performed by one or more other components of other suitable devices and/or software applications. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

In an implementation, the process 500 may be performed by the stroke group selector 315 when the stroke grouping is fixed (e.g., when no new input stroke has been received). In this example, every stroke belongs to one stroke group and one stroke group only, so these operations are done independently on each of the stroke groups taken in any order. For example, the handwritten content 210 includes a line of text corresponding to one stroke group in which the operations in FIG. 5 may be performed upon.

Writing orientation and ordering of the strokes within a stroke group depend on each other. An iterative algorithm estimates writing orientation and order of the strokes by repeating the two following steps until convergence: 1) estimate the direction of writing a and scale s at each stroke, based on their ordering, and 2) estimate the ordering of the strokes, based on their estimated writing direction.

In an example, the process 500 to estimate the writing orientation uses an initial estimated orientation, which in an implementation may be a horizontal orientation. The initial estimated writing orientation is then updated based on the operations described in FIG. 5.

In the first iteration, the ordering used in step 1) above depends on the situation: a) if the group has just been created (e.g., when no estimate of the order pre-exists): the strokes are ordered according to their position in the writing sequence (e.g., timestamp); and b) if the group is an existing group being updated: the existing ordering is used; new strokes are inserted at the end if they have been added by end-of-line merge (e.g., merging a new input stroke to a last stroke of an existing stroke group), or at their position in the writing order if they are delayed strokes.

The stroke group selector 315 estimates a direction of writing and scale of each stroke in a particular stroke group (502). In one or more implementations, writing orientation a is expressed by a directional vector with norm=1 at each stroke. It is computed as an average of vectors pointing from the current stroke center to centers of strokes within a neighborhood around the current stroke given by a certain window. The size of the window must be large enough to get robust estimation and small enough to capture changes in orientation of curved text lines. In an example implementation, a window of size 6 is utilized.

In one or more implementations, writing orientation is then smoothed using the average value of two neighboring strokes to suppress high frequency changes caused mostly by multi-stroke characters with vertical stroke order. The scale s of each stroke is a measure of the stroke bounding box when rotated along the orientation defined by the corresponding angle alpha (e.g., determined based on arctan (ay/ax)). The width and height of the stroke are, respectively, normalized by the x and y components of the vectors pointing from the center of the stroke to the centers of bounding boxes of its preceding and following neighbors. Like the orientation vectors, the scale vectors are smoothed using average scale values of neighboring strokes. This smoothing offers better robustness to high frequency changes caused by very tiny strokes like dots.

Strokes are ordered by the x-coordinate of their centers in a coordinate system rotated according to the estimated writing orientation (504). The writing orientation of the whole stroke group is determined using an average of the respective writing orientation of its strokes, which is then used to get a valid global ordering.

In at least one implementation, the process 500 converges in two or three steps. The writing orientation gets refined after a stable ordering is found by filtering out outliers and merging strokes with significant horizontal overlap.

Figure 6:
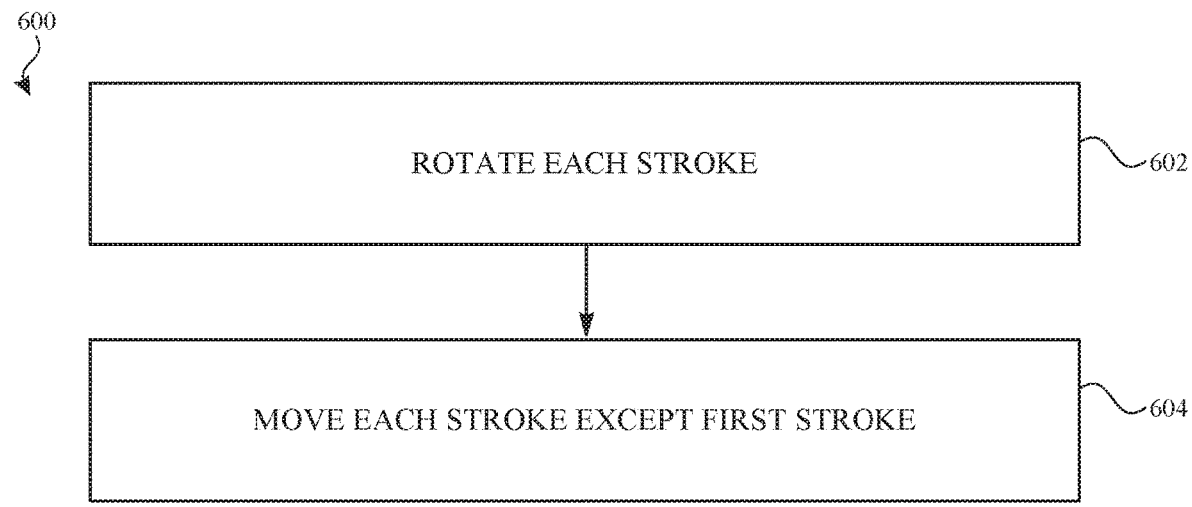
FIG. 6 illustrates a flow diagram of an example process for performing normalization of a given stroke group in accordance with one or more implementations.

FIG. 6 illustrates a flow diagram of an example process 600 for performing normalization of a given stroke group in accordance with one or more implementations. For explanatory purposes, the process 600 is primarily described herein with reference to components of the handwritten content processing system 305 of FIG. 3, which may be executed by the electronic device 110 of FIG. 1. However, the process 600 is not limited to the electronic device 110, and one or more blocks (or operations) of the process 600 may be performed by one or more other components of other suitable devices and/or software applications. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The stroke group normalizer 320 can straighten a curved text line into a regular horizontal line that can be fed to the handwritten content recognizer 325. Characters are rotated and positioned relative to one another according to the writing orientation. The result is an horizontal straight text line where the writing orientation is normalized, horizontally, left-to-right.

Whenever a new input stroke is received, the new input stroke is either merged with an existing stroke group or a new stroke group is established as discussed above. The process 500 estimating the writing orientation as described above in FIG. 5 is triggered upon creating or modifying a stroke group and thus every stroke group has its writing orientation determined in this manner.

A given stroke group is normalized by the stroke group normalizer 320, before being sent to the handwritten content recognizer 325, by rotating and positioning individual strokes in the stroke group.

The stroke group normalizer 320 rotates each stroke of a stroke group (602). In one or more implementations, each stroke is first rotated around its center according to the estimated orientation of this stroke:

$Pr\_i$=rotationMatrix($-\alpha\_i$)*($P\_i-c\_i$), where $P\text{-}i$ are original points of the $i$-th stoke and $Pr\_i$ are its rotated points, and $c\_i$ is the center of $i$-th stroke. $\alpha\_i$ is the angle computed from the writing orientation estimate at stroke $i$.

The stroke group normalizer 320 moves each stroke except the first stroke of the stroke group (604). In one or more implementations, each rotated stroke is then translated (e.g., moved) so its center gets into a normalized position based on the following:

$Pn\_i=Pr\_i+cn\_i$, where $Pn\_i$ are normalized points of the $i$-th stroke and $cn\_i$ is the normalized center of the $i$-th stroke.

The normalized center of each stroke is given by translation of the normalized center of the previous stroke by an inter-stroke vector rotated by an average of the orientation angles of the two strokes:

$cn\_i=cn\_i\text{-}1+$rotationMatrix($-((\alpha\_i+\alpha\_i\text{-}1)/2)$)*$v\_i,i-1$, where $v\_i,i\text{-}1$ is the vector from previous stroke center to the current stroke center.

As mentioned above, the first stroke in the stroke group is not translated, and only rotated. By reference to FIG. 2, the handwritten content 270 illustrates a normalized stroke group corresponding to a line of text (e.g., overlaid on the original curved line of text) that is an example of the results of the operations described above in FIG. 6.

Figure 7:
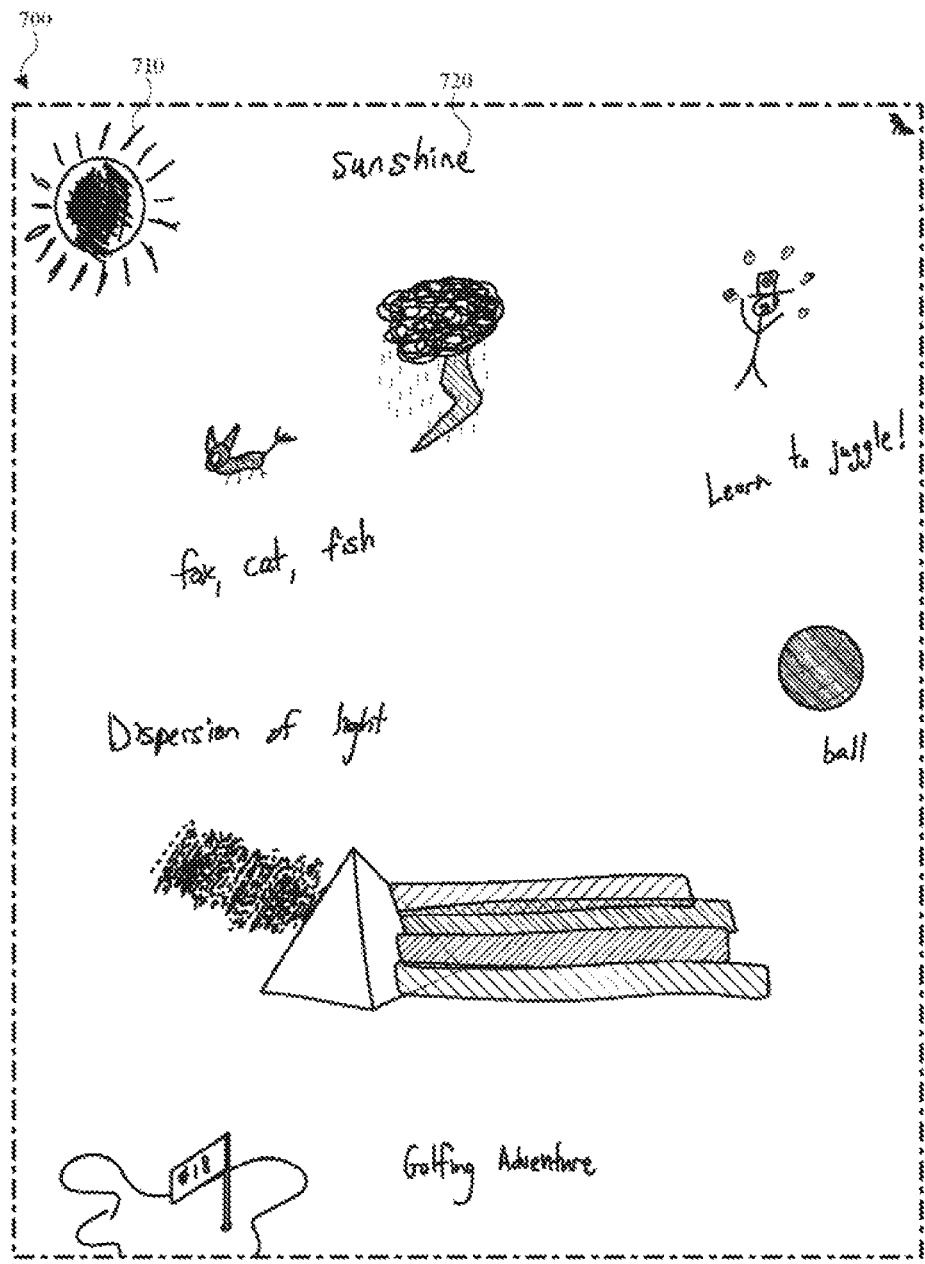
FIG. 7 illustrates an example of handwritten content that also includes non-textual information (e.g., artwork, doodles, etc.) in accordance with one or more implementations.

FIG. 7 illustrates an example of handwritten content 700 that also includes non-textual information (e.g., artwork, doodles, etc.) in accordance with one or more implementations. During the processes for determining different lines of text described above that may be included in handwritten content, the subject technology can further distinguish between textual information and non-textual information as it may be common that such non-textual information corresponding to doodles, drawings and/or artwork are also include in the handwritten content. Instead of erroneously recognizing such non-textual information as one or more text characters, the subject technology can avoid performing handwritten character recognition on such non-textual information. In existing approaches, non-textual information might undergo handwritten character recognition which would then produce erroneous results with the added cost of wasting system resources for an unnecessary step.

As illustrated in FIG. 7, the handwritten content 700 includes non-textual information 710 corresponding to a doodle or artwork, in a first region of the handwritten content 700, as input by a user. Further, the handwritten content 700 also includes a line of text 720 with textual information that includes different characters in a second region of the handwritten content 700. Implementations of the stroke group selector 315 are enabled to distinguish between the line of text 720 and the non-textual information 720 even before such non-textual information is passed to the stroke group normalizer 320 and/or the handwritten content recognizer 325 thereby conserving system resources for the electronic device 110. In the event that such non-textual information is passed to the handwritten content recognizer, implementations of the subject technology can determine whether a given stroke group received by the handwritten content recognizer is likely to contain non-textual information by looking at substrings that are being recognized and comparing the substrings with a lexicon or dictionary of words in a recognized language to determine candidate words, then determining a confidence score for each candidate word and whether the confidence score is below a minimum threshold score.

In the example of FIG. 7, the handwritten content 700 may correspond to a document or note that was created by a user and stored on the electronic device 110. In at least an implementation, recognized text in the line of text 720 (e.g., corresponding to the word and characters making up "sunshine") in the second region of the handwritten content 700 may be utilized as a title for the document or note corresponding to the handwritten content 700. The title of handwritten content 700 may be stored in the handwritten content index 342 and then be used for searching the contents of the handwritten content 700. An example graphical user interface for performing a search is described in FIG. 8.

Figure 8:
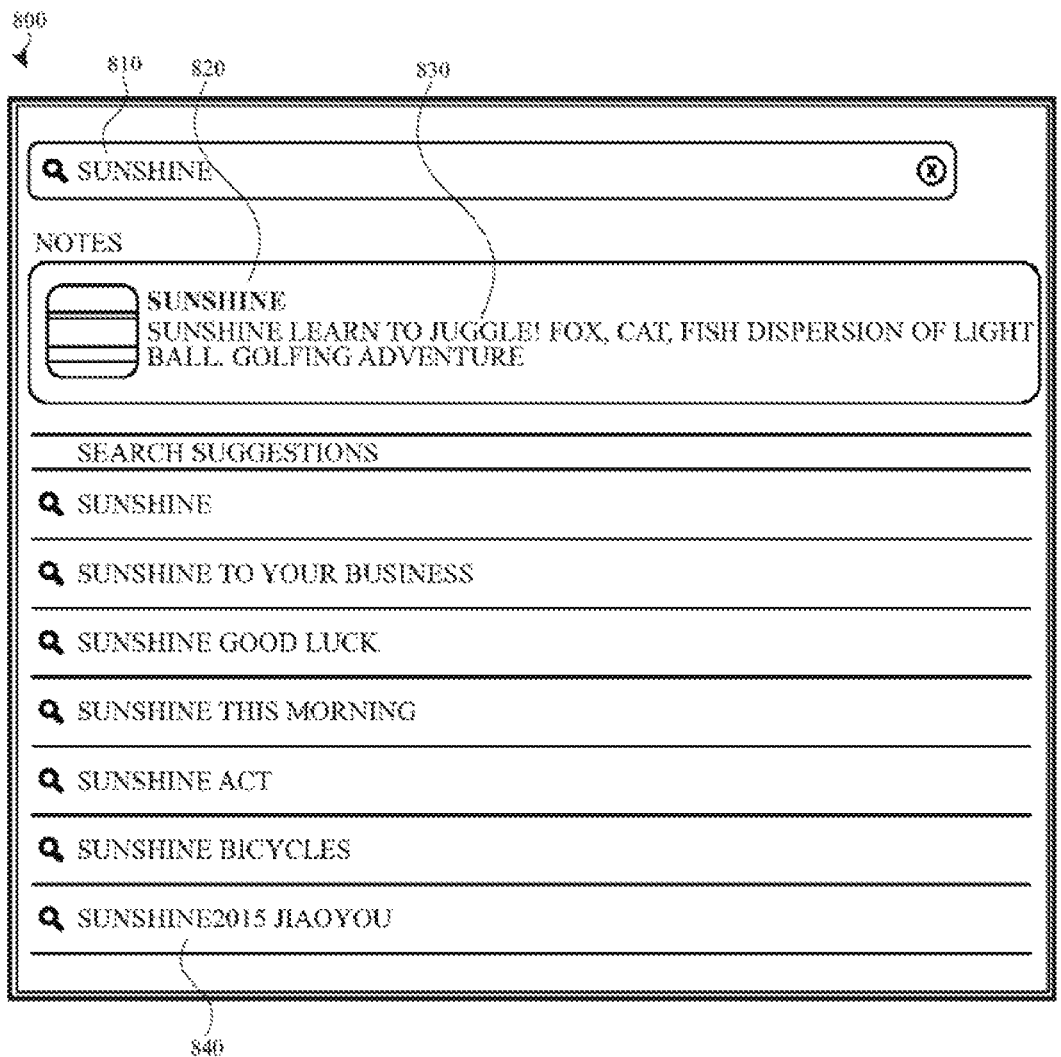
FIG. 8 illustrates an example graphical user interface for performing a search on handwritten content in accordance with one or more implementations.

FIG. 8 illustrates an example graphical user interface (GUI) 800 for performing a search on handwritten content in accordance with one or more implementations. FIG. 8 will be discussed by reference to components described in FIG. 3.

As shown in FIG. 8, the GUI 800 includes a search input field 810, a search result 820, and search suggestions 840. The system search component 350 may receive input corresponding to a search keyword as provided in the search input field 810 and then perform a search using the handwritten content index 342. The system search component 350 may provide the search result 820 corresponding to the handwritten content 700 in FIG. 7 based on the search keyword. As shown, the search result 820 includes the title of the handwritten content 700 along with textual information 830 corresponding to the recognized words and characters included in the handwritten content 700. Further, it should be noted that the search result 820 does not include words and/or characters that may have resulted from an erroneous handwritten character recognition of artwork and/ or doodles in the handwritten content 700 discussed above. The GUI 800 also includes the search suggestions 840 which include a listing of other search suggestions based on the search keyword from the search input field 810.

Figure 9:
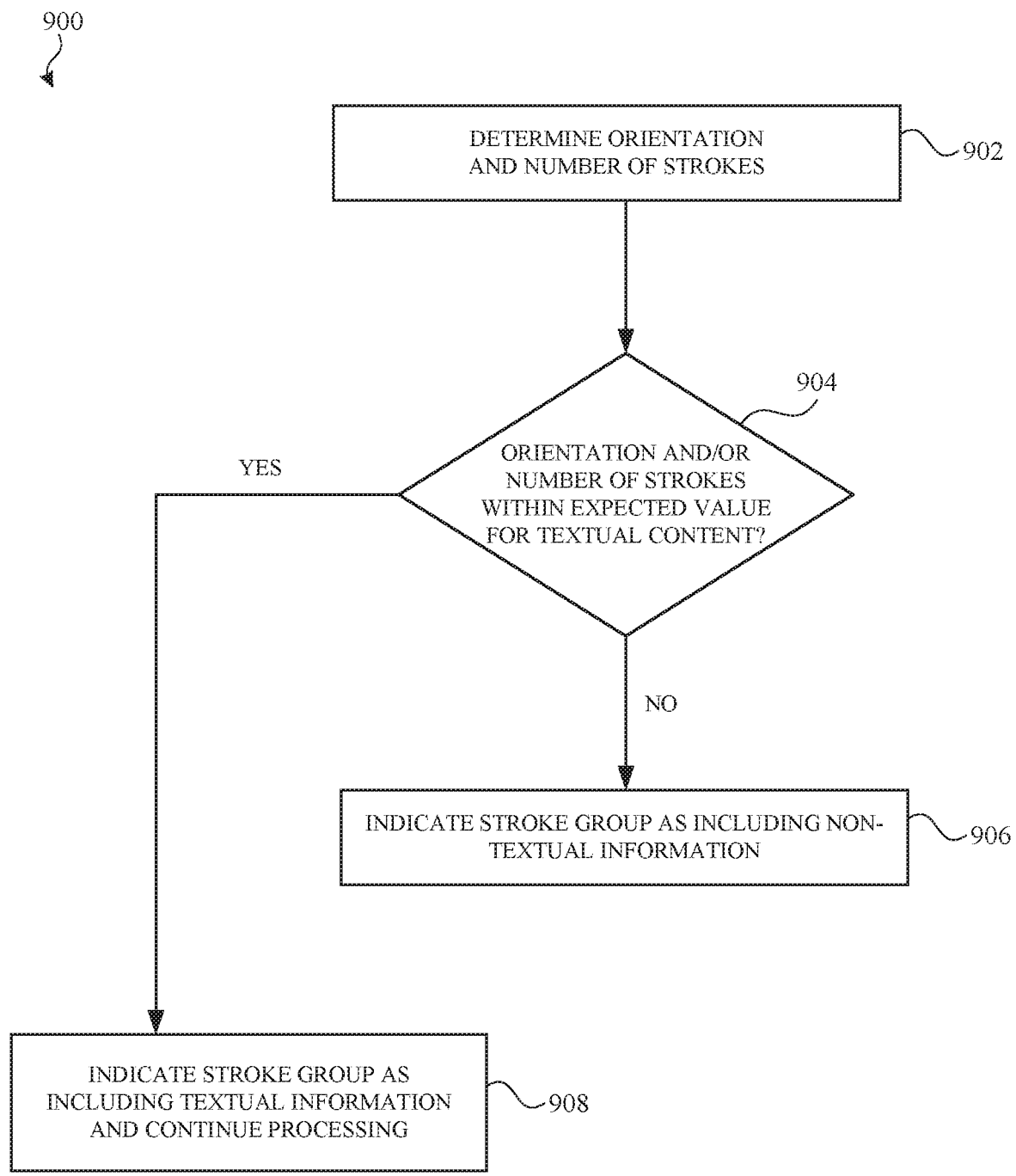
FIG. 9 illustrates a flow diagram of an example process for determining non-textual information during a grouping of strokes in accordance with one or more implementations.

FIG. 9 illustrates a flow diagram of an example process 900 for determining non-textual information during a grouping of strokes in accordance with one or more implementations. For explanatory purposes, the process 900 is primarily described herein with reference to components of the handwritten content processing system 305 of FIG. 3, which may be executed by the electronic device 110 of FIG. 1. However, the process 900 is not limited to the electronic device 110, and one or more blocks (or operations) of the process 900 may be performed by one or more other components of other suitable devices and/or software applications. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

The process 900 illustrated in FIG. 9 may be performed in conjunction with the process 400 discussed by reference to FIGS. 4A and 4B that assigns an input stroke to a stroke group, and the process 500 in FIG. 5 that determines writing orientation and scale of each stroke. As discussed in FIG. 7, in some instances, non-textual information may be included in handwritten content. In an example, a general orientation of non-textual information corresponding to a drawing or doodle may be different than a line of text. Further, a number of strokes included in non-textual information may be different than an expected number of strokes in a line of text.

The stroke group selector 315 determines an orientation (e.g., as described above with respect to FIG. 5) and number of strokes for a stroke group (902). The stroke group selector 315 can compare the orientation of the stroke group and/or the number of strokes with expected values of each corresponding to textual information (904). Such expected values may be based on historical information collected by the stroke group selector 315 and/or provided ahead of time based on training information for one or more languages. If the orientation of the stroke group and/or the number of strokes are not within the expected values, the stroke group selector 315 indicates that the stroke group includes non-textual information (906). In an example, the stroke group selector 315 can stop processing the stroke group at this point. Alternatively, if the orientation of the stroke group and/or the number of strokes are within the expected values, the stroke group selector 315 indicates that the stroke group includes textual information and continues processing the stroke group (e.g., by performing the operations described above in FIGS. 4A, 4B, and 5) (908).

Figure 10:
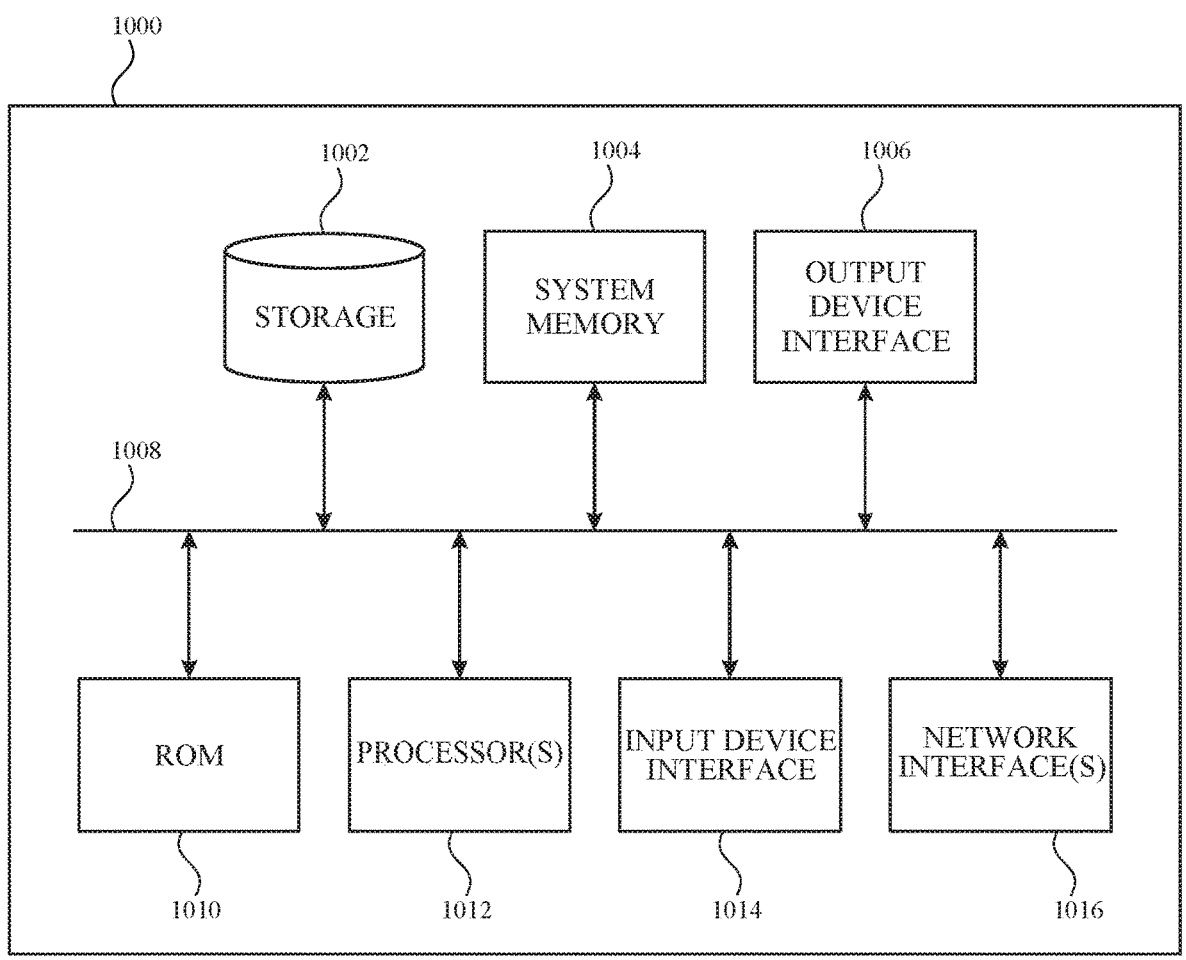
FIG. 10 illustrates an electronic system with which one or more implementations of the subject technology may be implemented.

FIG. 10 illustrates an electronic system 1000 with which one or more implementations of the subject technology may be implemented. The electronic system 1000 can be, and/or can be a part of, the electronic device 110, and/or the server 120 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the electronic device 110 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   rendering handwritten content for display by an electronic device, the handwritten content including an existing stroke group, the existing stroke group comprising a plurality of previously received input strokes;
   storing a writing direction for each of the previously received input strokes in the existing stroke group;
   receiving, after rendering the handwritten content and storing the writing direction for each of the previously received input strokes in the existing stroke group, a new input stroke;
   determining whether the new input stroke is associated with the existing stroke group based on at least one of the stored writing directions for the previously received input strokes in the existing stroke group;
   merging the new input stroke with the existing stroke group in response to determining that the new input stroke is associated with the existing stroke group;
   determining a local orientation of a merged stroke group that includes the new input stroke and the previously received input strokes, based on the stored writing direction for each of the previously received input strokes in the existing stroke group and a writing direction of the new input stroke; and
   normalizing the merged stroke group using the determined local orientation.

2. The method of claim 1, further comprising determining, prior to receiving the new input stroke, the local orientation of the existing stroke group using an average of the stored writing directions for the previously received input strokes in the existing stroke group.

3. The method of claim 2, wherein determining the local orientation of the existing stroke group is further based on an estimate of an ordering of the previously received input strokes of the existing stroke group, the ordering being based on the stored writing directions.

4. The method of claim 1, further comprising:
   performing handwritten character recognition on the normalized merged stroke group to provide a set of recognized characters.

5. The method of claim 4, further comprising:
   storing a word formed by the set of recognized characters in an index for searching.

6. The method of claim 5, further comprising:
   using the word formed by the set of recognized characters as a title of a document corresponding to handwritten content including the set of recognized characters.

7. The method of claim 5, further comprising:
   receiving a search keyword;
   performing a search using the index to locate a document corresponding to handwritten content; and
   providing, as a search result, the document corresponding to handwritten content.

8. The method of claim 1, wherein determining whether the new input stroke is associated with the existing stroke group further comprises:
   determining a last stroke of the existing stroke group;
   determining an oriented distance from the last stroke to the new input stroke; and
   determining that the oriented distance meets a threshold value.

9. The method of claim 8, further comprising:
determining a last stroke of a second existing stroke group;
determining a second oriented distance from the last stroke of the second existing stroke group to the new input stroke; and
determining whether the oriented distance from the last stroke of the second existing stroke group meets the threshold value.

10. The method of claim 9, further comprising:
determining, using timestamp information, that the last stroke of the existing stroke group is a more recent stroke between the last stroke of the existing stroke group and the last stroke of the second existing stroke group; and
merging the new input stroke with the existing stroke group based on the determining of the more recent stroke.

11. The method of claim 1, wherein normalizing the merged stroke group comprises:
rotating each stroke in the existing stroke group; and
moving each stroke, except for a first stroke, in the existing stroke group.

12. The method of claim 1, wherein determining the local orientation of the merged stroke group that includes the new input stroke and the previously received input strokes comprises determining the local orientation of the merged stroke group based on the stored writing direction and a stored scale for each of the previously received input strokes in the existing stroke group and the writing direction and a scale of the new input stroke, the method further comprising:
determining that non-textual information is included in a second stroke group; and
disregarding the non-textual information for handwritten character recognition.

13. An electronic device, comprising:
a processor;
a memory device containing instructions, which when executed by the processor, cause the processor to:
render handwritten content for display by the electronic device, the handwritten content including an existing stroke group, the existing stroke group comprising a plurality of previously received input strokes;
store a writing direction for each of the previously received input strokes in the existing stroke group;
receive, after rendering the handwritten content and storing the writing direction for each of the previously received input strokes in the existing stroke group, a new input stroke;
determine whether the new input stroke is associated with the existing stroke group based on at least one of the stored writing directions for the previously received input strokes in the existing stroke group;
merge the new input stroke with the existing stroke group in response to determining that the new input stroke is associated with the existing stroke group;
determine a local orientation of a merged stroke group that includes the new input stroke and the previously received input strokes, based on the stored writing direction for each of the previously received input strokes in the existing stroke group and a writing direction of the new input stroke; and
normalize the merged stroke group using the determined local orientation.

14. The electronic device of claim 13, wherein the instructions, when executed by the processor, cause the processor to determine whether the new input stroke is associated with the existing stroke group by:
determining a last stroke of the existing stroke group;
determining an oriented distance from the last stroke to the new input stroke; and
determining that the oriented distance meets a threshold value.

15. The electronic device of claim 14, wherein the memory device contains further instructions, which when executed by the processor, further cause the processor to:
determine a last stroke of a second existing stroke group;
determine the oriented distance from the last stroke of the second existing stroke group to the new input stroke; and
determine whether the oriented distance from the last stroke of the second existing stroke group meets the threshold value.

16. The electronic device of claim 13, wherein the instructions, when executed by the processor, further cause the processor to temporarily store the new input stroke in a buffer while determining whether the new input stroke is associated with the existing stroke group.

17. The electronic device of claim 13, wherein the memory device contains further instructions, which when executed by the processor further cause the processor to:
determine that non-textual information is included in a second stroke group; and
disregard the non-textual information for handwritten character recognition.

18. A non-transitory computer-readable medium comprising instructions, which when executed by a computing device, cause the computing device to perform operations comprising:
rendering handwritten content for display by an electronic device, the handwritten content including an existing stroke group, the existing stroke group comprising a plurality of previously received input strokes;
storing a writing direction for each of the previously received input strokes in the existing stroke group;
receiving, after rendering the handwritten content and storing the writing direction for each of the previously received input strokes in the existing stroke group, a new input stroke;
determining whether the new input stroke is associated with the existing stroke group based on at least one of the stored writing directions for the previously received input strokes in the existing stroke group;
merging the new input stroke with the existing stroke group in response to determining that the new input stroke is associated with the existing stroke group;
determining a local orientation of a merged stroke group that includes the new input stroke and the previously received input strokes, based on the stored writing direction for each of the previously received input strokes in the existing stroke group and a writing direction of the new input stroke; and
normalizing the merged stroke group using the determined local orientation.

19. The non-transitory computer-readable medium of claim 18, wherein the local orientation of the merged stroke group is based on a directional vector of the new input stroke and a directional vector of each stroke in the existing stroke group.

20. The method of claim 1, wherein each of the previously received input strokes in the existing stroke group comprises data received between a respective initial touch input and a release of the respective initial touch input.

\* \* \* \* \*